United States Patent

Malow

Patent Number: 5,280,694
Date of Patent: Jan. 25, 1994

[54] APPARATUS AND METHOD FOR STACKING SMALL GOODS

[75] Inventor: Siegmar Malow, Konstanz, Fed. Rep. of Germany

[73] Assignee: Licentia Patent-Verwaltungs GmbH, Frankfurt, Fed. Rep. of Germany

[21] Appl. No.: 838,302

[22] PCT Filed: Jun. 26, 1991

[86] PCT No.: PCT/EP91/01197
§ 371 Date: Mar. 10, 1992
§ 102(e) Date: Mar. 10, 1992

[87] PCT Pub. No.: WO92/00908
PCT Pub. Date: Jan. 23, 1992

[30] Foreign Application Priority Data

Jul. 12, 1990 [DE] Fed. Rep. of Germany ....... 4022162

[51] Int. Cl.⁵ .................. B65B 5/08; B65B 25/14; B65G 57/28
[52] U.S. Cl. .................. 53/475; 53/244; 53/252; 53/542
[58] Field of Search .............. 53/542, 540, 541, 243, 53/242, 244, 252, 258, 255, 263, 475, 473

[56] References Cited

U.S. PATENT DOCUMENTS

| 4,007,575 | 2/1977 | Hartman | 53/542 X |
| 4,518,160 | 5/1985 | Lambrechts et al. | 53/542 X |
| 5,135,352 | 8/1992 | Scata et al. | 53/542 X |

FOREIGN PATENT DOCUMENTS

| 154093 | 9/1985 | European Pat. Off. |
| 0340502 | 11/1989 | European Pat. Off. |
| 3523288 | 1/1987 | Fed. Rep. of Germany |
| 1204400 | 1/1960 | France |

*Primary Examiner*—James F. Coan
*Attorney, Agent, or Firm*—Spencer, Frank & Schneider

[57] ABSTRACT

An apparatus for stacking small goods, particularly small packages, in a container, the apparatus including a separating module by means of which the small goods are conducted over a surface disposed upstream of the container. The opening of the container is arranged to be pivotal at the end of the surface and a pusher is disposed on the surface so as to move in the direction of the container opening, the apparatus further including a retaining threshold and a downwardly pivotal rake that is arranged downstream of the retaining threshold.

8 Claims, 3 Drawing Sheets

APPARATUS AND METHOD FOR STACKING SMALL GOODS

BACKGROUND OF THE INVENTION

The invention relates to an apparatus for stacking small goods, particularly small packages, in a container.

Such devices are known in which the small goods to be stacked are tipped over into a receiving container. The goods here move over a sloped surface or are conducted into the receiving container by means of a tiltable bowl.

These prior art devices have the drawback that proper stacking in the container and thus good space utilization of the container is not provided.

SUMMARY OF THE INVENTION

It is an object of the invention to provide an apparatus for stacking small goods, particularly small packages, in which the small goods to be stacked are deposited in the container in an orderly fashion and the container can then be transported away on a conveyor belt.

According to the invention this is accomplished by a separating module by means of which the small goods are conducted over a surface disposed upstream of the container. The opening of the container is arranged to be pivotal at the end of the surface and a pusher is disposed on the surface so as to move in the direction of the container opening, the apparatus further including a retaining threshold and a downwardly pivotal rake that is arranged downstream of the retaining threshold.

BRIEF DESCRIPTION OF THE DRAWINGS

One embodiment of the invention will now be described with reference to the attached drawings.

DETAILED DESCRIPTION OF THE INVENTION

Figure 1:
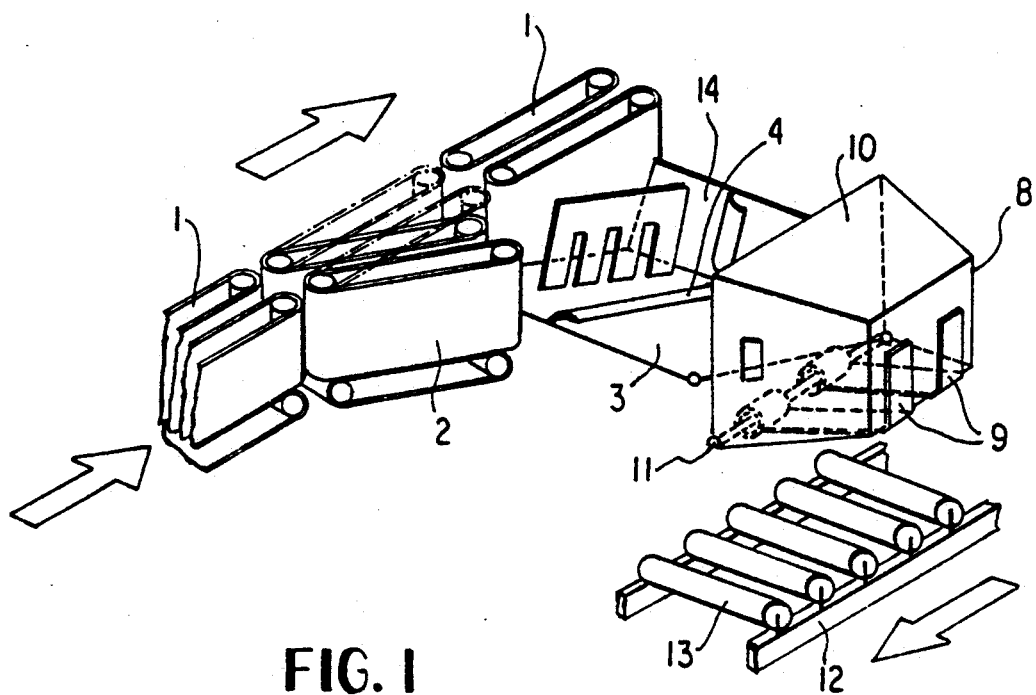
FIG. 1 shows an apparatus according to the invention with the container pivoted inward for stacking of the small goods.

In the drawing, a transporting path for the small goods to be stacked is marked 1; it supplies the small goods to the individual stacking stations. The small goods are conducted out of the transporting path by means of a separating module 2 composed of laterally pivotal conveyor belts. The separating module directs the small goods 18 onto a surface 3 that is disposed in front of the container and is provided with a triangular retaining threshold 4 and with pivotal, angular covering rakes 5. Additionally, a pusher 6 is disposed on surface 3 and is displaceable by means of push rod 7 in the direction of the opening of the container. The container 8 for accommodating the small goods is pivoted by means of angular elements 9 in front of the end of surface 3 in such a manner that its opening 10 is flush with surface 3 so that the small goods can be pushed into the container.

The angular elements 9 are arranged at a rotation and pivot shaft 11 in such a manner that the container can be pivoted away from surface 3 at an angle by pivoting angles 9 and shaft 11 and can be placed onto a conveyor belt 12 therebelow. After pivoting, the angled portions of the angular elements 9 lie below the rollers 13 of conveyor belt 12.

A wall 14 lies perpendicular to surface 3; the end of this wall and the end of surface 3 lie flush against the edges of opening 10 of container 8.

A pivotal rake 15 is disposed at wall 14 with the width of the rake teeth 16 corresponding to the distance between the teeth 17 of covering rake 5.

Figure 3:
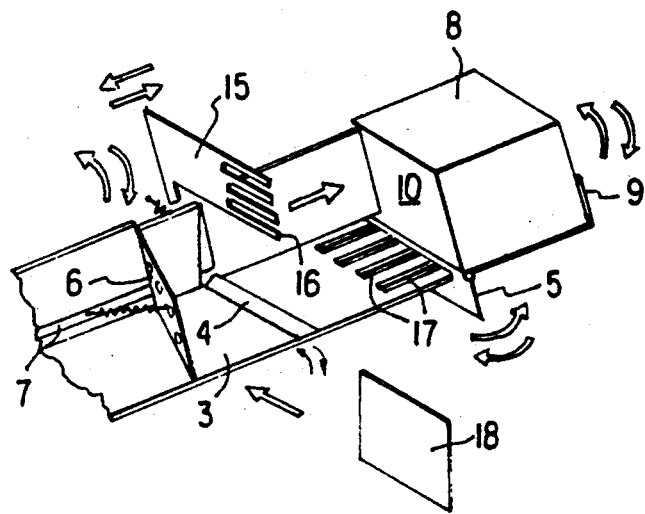
FIGS. 3, 4, 5, 6, 7 and 8 are detail views of the stacking process.
Figure 4:
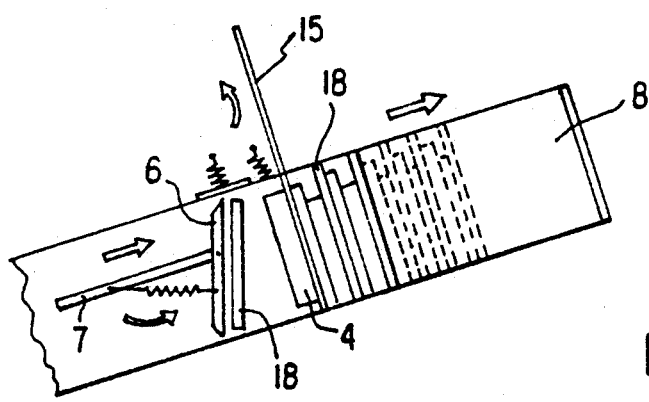
Figure 5:
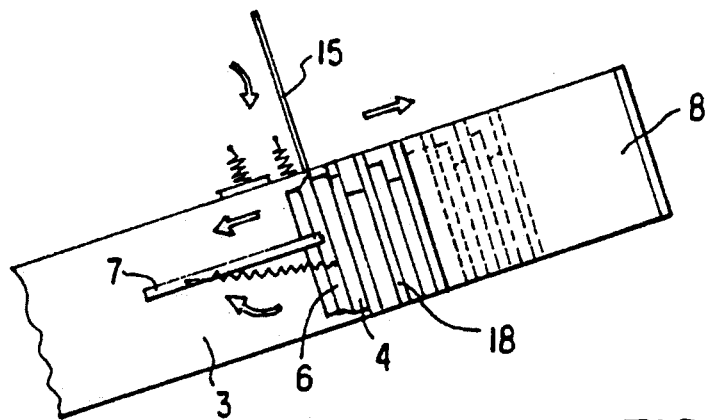
Figure 6:
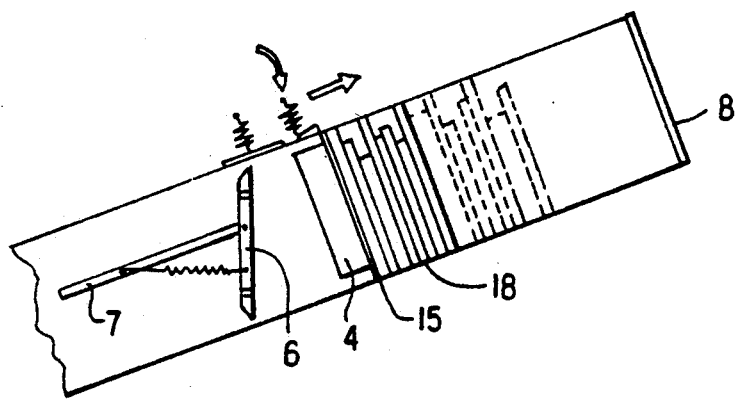

The stacking process will now be described as follows:

The small goods 18 are transported onto surface 3 by means of separating module 2 (FIG. 3) and pusher 6 pushes them over retaining threshold 4 on surface 3 (FIGS. 4 and 5). This process is repeated until the fill level of the container has been reached. The fill height is here monitored by sensors. Once the fill height is reached, rake 15 pivots onto surface 3 and pushes all small pieces 18 into container 8 (FIGS. 5 and 6).

Figure 7:
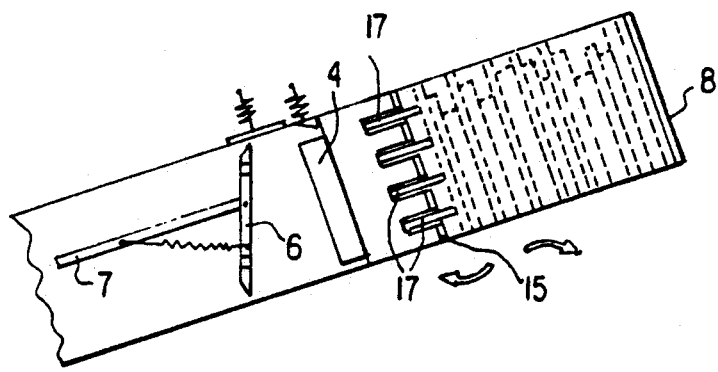
Figure 8:
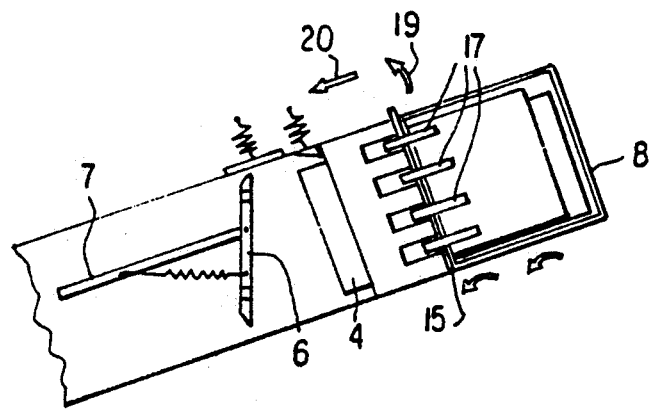

Then, the teeth 17 of the angular covering rake 5 pivot upward and retain in the container the small pieces 18 that have been pushed into the container (FIG. 7). The push-in rake 15 may then be pushed upward and retracted as shown in FIG. 8 by arrows 19, 20.

Figure 2:
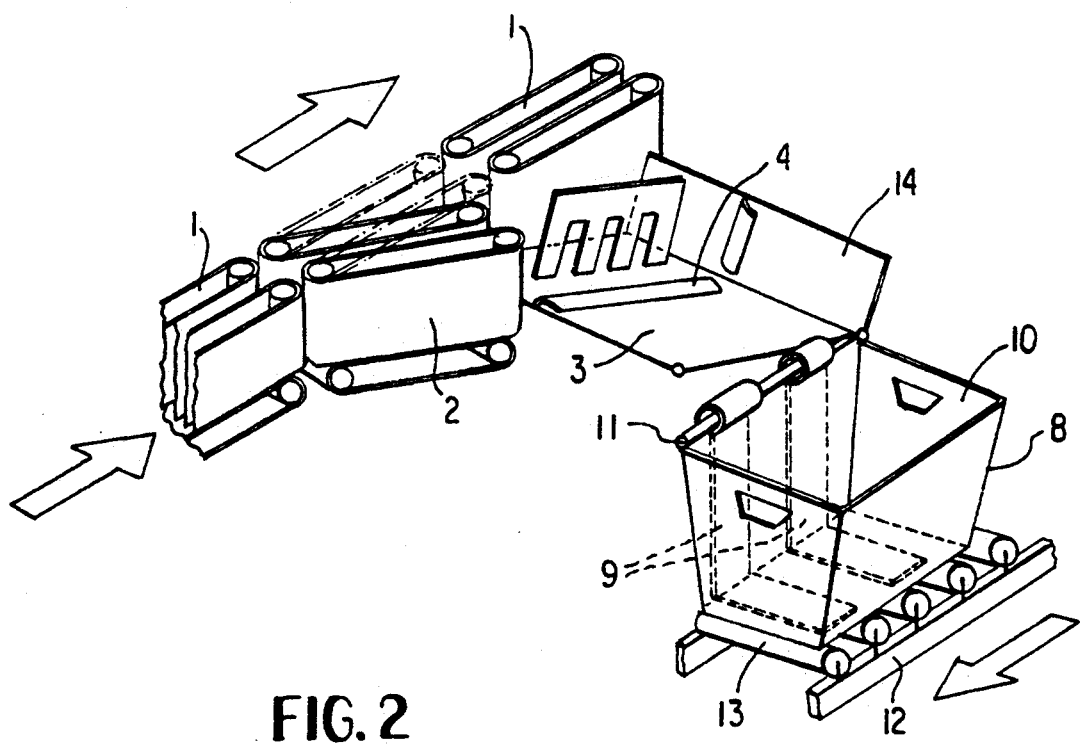
FIG. 2 shows the apparatus according to the invention with the container pivoted out for further transport.

FIG. 2 shows the pivoting away of the filled container. The pivoting process takes place in that the rotation and pivot shaft 11 is pivoted outwardly and the angular elements 9 are lowered. As already mentioned above, container 8 then lies on the rollers 13 of conveyor belt 12 and can be transported away.

I claim:

1. A method of operating an apparatus for stacking small goods, particularly small packages, in a container having an opening comprising the steps of supplying the small goods to a surface disposed in front of the container by way of a separating module, the opening of the container being arranged so as to be pivotal at the end of the surface; pushing the small goods using a pusher over a retaining threshold on the surface, the pusher being movable in the direction toward the opening and being disposed on the surface; pushing the individual small goods into the container using a rake that is disposed downstream of the retaining threshold and is pivotal downward; holding the pushed-in small goods in the container by pivoting out an outwardly pivotal angular covering rake; and lowering thereafter the container by way of angular elements onto a conveyor belt.

2. Method according to claim 1, wherein said step of pushing the small goods over a retaining threshold includes providing said threshold with a triangular configuration.

3. Method according to claim 1, wherein said holding step includes disposing the outwardly pivotal angular covering rake on the surface upstream of the container.

4. An apparatus for stacking small goods, particularly small packages, in a container, characterized in that the small goods are supplied by way of a separating module to a surface disposed in front of the container; the opening of the container is arranged so as to be pivotal at the end of the surface and a pusher that is movable in the direction toward the opening of the container is disposed on the surface, the apparatus further including an outwardly pivotal angular covering rake being disposed on the surface upstream of the opening of the container, a retaining threshold and a rake that is disposed downstream of the retaining threshold and is pivotal downwardly.

5. An apparatus according to claim 4, characterized in that the pivotal rake has rake teeth whose width corresponds to the distance between the teeth of the covering rake.

6. An apparatus according to claim 4, characterized in that the retaining threshold has a triangular configuration.

7. An apparatus according to claim 6, characterized in that the pivotal rake has rake teeth whose width corresponds to the distance between the teeth of the covering rake.

8. An apparatus for stacking small goods, particularly small packages, in a container, characterized in that the small goods are supplied by way of a separating module to a surface disposed in front of the container; the opening of the container is arranged so as to be pivotal at the end of the surface and a pusher that is movable in the direction toward the opening of the container is disposed on the surface, the apparatus further including a retaining threshold having a triangular configuration and a rake that is disposed downstream of the retaining threshold and is pivotal downwardly.

* * * * *